US005773105A

United States Patent [19]
Klett

[11] Patent Number: 5,773,105
[45] Date of Patent: Jun. 30, 1998

[54] ABSORBENT PACKET

[75] Inventor: George E. Klett, Albuquerque, N. Mex.

[73] Assignee: United Catalysts Inc. - Desiccants, Belen, N. Mex.

[21] Appl. No.: 612,276

[22] Filed: Mar. 7, 1996

[51] Int. Cl.$^6$ .................................................... B65D 81/26
[52] U.S. Cl. ...................... 428/34.7; 428/35.7; 428/36.1; 428/76; 428/312.2; 428/315.5; 428/319.1; 428/913; 206/204; 206/484.1; 206/484.2
[58] Field of Search ................................. 428/35.7, 36.1, 428/36.2, 36.4, 76, 35.2, 34.5, 34.6, 34.7, 307.7, 312.2, 319.1, 91, 315.5; 206/204, 484, 484.1, 484.2

[56] References Cited

U.S. PATENT DOCUMENTS

| | | | |
|---|---|---|---|
| 3,326,810 | 6/1967 | Delan et al. | 428/76 |
| 3,745,057 | 7/1973 | Loft et al. | 428/44 |
| 4,036,360 | 7/1977 | Deffeyes | 206/204 |
| 4,725,465 | 2/1988 | Lastovitch | 428/34.3 |
| 4,748,069 | 5/1988 | Cullen | 428/195 |
| 4,749,600 | 6/1988 | Cullen et al. | 428/34.3 |
| 4,756,939 | 7/1988 | Goodwin | 428/74 |
| 4,802,574 | 2/1989 | Akiba | 206/204 |
| 4,853,266 | 8/1989 | Cullen | 428/35.7 |
| 4,856,649 | 8/1989 | Inoue | 206/204 |
| 4,927,010 | 5/1990 | Keril | 206/204 |
| 4,969,750 | 11/1990 | Russo et al. | 383/113 |
| 5,011,698 | 4/1991 | Anton, Jr. et al. | 426/395 |
| 5,037,459 | 8/1991 | Spruill et al. | 206/204 |
| 5,148,613 | 9/1992 | Cullen | 34/81 |
| 5,324,448 | 6/1994 | Mayeaux | 252/194 |
| 5,391,322 | 2/1995 | Mayeaux | 252/394 |
| 5,431,970 | 7/1995 | Brown et al. | 428/36.5 |

FOREIGN PATENT DOCUMENTS

| | | |
|---|---|---|
| 678321A | 10/1995 | European Pat. Off. . |
| 2701219A | 2/1993 | France . |
| 57-209638A | 12/1982 | Japan . |
| 61-103523A | 5/1986 | Japan . |
| 2144121A | 1/1990 | Japan . |
| 3169322A | 7/1991 | Japan . |
| 7123875A | 5/1995 | Japan . |
| 2161093A | 1/1996 | United Kingdom . |

OTHER PUBLICATIONS

Nago, et al. "Structure of Microporous Polypropylene Sheets Containing CaCO$_3$ Filler" Journal of Applied Polymer Science, vol. 45, pp. 1527–1535 (1992).

Nakamura, et al. "Microporous Polypropylene Sheets Containing CaCO$_3$ Filler" Journal of Applied Polymer Science, vol. 39, pp. 143–150 (1993).

*Primary Examiner*—Rena L. Dye
*Attorney, Agent, or Firm*—Scott R. Cox

[57] ABSTRACT

An absorbent packet for absorbing water vapor. The absorbent packet comprises a gas permeable, multi-layered packaging material which absorbs water vapor, but does not permit liquid water within the packet from flowing back through the packaging material, wherein the packaging material preferably comprises a microporous film, a gas permeable film and a binder to bind the microporous film to the gas permeable film, and an absorbent material incorporated between the layers of the multi-layered packaging material. This absorbent packet is particularly useful for absorbing water vapor in shipping containers where changes in the atmospheric conditions result in variable relative humidity in the shipping container.

24 Claims, No Drawings

ABSORBENT PACKET

(b) BACKGROUND OF INVENTION

1. Field of Invention

This invention relates to absorbent products. More specifically, this invention is an absorbent packet for use within shipping containers for absorbing water vapor.

2. Prior Art

Packets containing absorbent and desiccant materials have been available for many years. The absorbent and desiccant materials are intended to absorb moisture and prevent that moisture from adversely affecting both the packets in which the absorbent or desiccant materials are contained and products shipped in shipping containers in which such packets are placed.

It is also well known that liquid water present in metal shipping containers can cause rusting. The likelihood that these shipping containers will rust increases if the shipping containers are used to store products over great distances for long periods of time. For example, commercial food products are often transported in shipping containers for weeks at a time on container ships. Often during the time the products are being shipped, the shipping containers are subjected to a variety of atmospheric conditions, including situations where high humidity is present. Because of the significant amount of time necessary for such long distance shipping and the resulting long term exposure of the shipping containers and the products within those shipping containers to water and water vapor caused by the high humidity in the atmosphere, a significant rusting problem in these shipping containers now exists. This problem adversely affects not only the shipping containers, but also the packaging for the shipped products, the products themselves and machinery utilized with the shipping containers.

Thus, reliable products are needed to control the relative humidity within such shipping containers for the long period of shipping. In addition, once water vapor has been absorbed into a packet, it is important that the water vapor not be released back into the shipping container in the form of liquid water, even if the high humidity conditions continue. Such release increases the likelihood of rusting of the shipping containers and the associated machinery.

The concept of utilizing desiccants or absorbent products to remove moisture from the air in conjunction with vapor corrosion inhibitors is known in the art. For example, U.S. Pat. No. 5,324,448 discloses a desiccant container which also contains vapor corrosion inhibitor. The packaging material for this product is a spun-bonded olefin, preferably a spun-bonded polyethylene, marketed as TYVEK, a registered trademark of the DuPont de Nemours Company. See also U.S. Pat. No. 5,391,322.

Another water absorbing product is disclosed in U.S. Pat. No. 5,148,613. This product is a closet drier, containing a desiccant material for absorbing moisture. The packaging of the cover for this container is also a spun-bonded polyolefin, preferably TYVEK®.

U.S. Pat. No. 4,856,649 discloses a deodorizer parcel wherein the structure of the parcel body is a composite material formed from a gas permeable sheet, such as a sheet of paper or a non-woven cloth, and a plastic film, such as a polypropylene film, laminated on and bonded to the gas permeable sheet. The plastic film has a multiplicity of minute pores formed by subjecting the film to irradiation with a laser beam.

U.S. Pat. No. 3,745,057 discloses a sterilizable package and desiccant product wherein the film forming the cover for the package is an open-celled microporous film. The microporous film is formed by a process of sequential cold stretching and hot stretching the film to impart the open-celled structure to the microporous film.

Other liquid absorbing and immobilizing packets are disclosed by U.S. Pat. Nos. 4,748,069 and 4,749,600. The packaging for these products is a combination of starch paper and polyvinyl acetate, which packaging dissolves in water. See also U.S. Pat. No. 4,853,266.

A number of absorbent packets have also been disclosed which are utilized for the shipping of hazardous liquids wherein the packaging material for those products includes an absorbent product. However, the outside layer of the packaging for these products is required to be impermeable to water vapor. See, for example, U.S. Pat. No. 4,969,750 and 4,927,010.

Finally, there have been a number of absorbent pad products which are used with food products to absorb fluids from the food. The packaging material for these products is generally formed from a sandwich-type structure containing a liquid permeable layer on one side, a liquid impermeable layer on the opposite side and a fluid absorbent inner layer between the liquid permeable and impermeable layers. See, for example, U.S. Pat. No. 4,756,939 and 4,802,574. Because the goal of these products is to absorb liquid discharge from food, liquid permeability of the outside layer is critical to these products.

While a number of these products are useful in absorbing liquids and water vapor, there is still a need for improved absorbent products, especially absorbent packets for use in shipping containers to maintain a constant relative humidity within the container. It is critical that these absorbent packets be able to absorb large quantities of water vapor while at the same time not permit liquid water, which may form inside of the absorbent packet, from permeating back into the surrounding environment. In addition, it is important that these absorbent packets be able to maintain relative humidity within a shipping container for long periods of time regardless of changes in humidity and temperature. In addition, it is important that these absorbent products be low cost and easy to manufacture.

Accordingly it is the object of this invention to prepare an absorbent packet for absorbing water vapor.

It is a further object of this invention to prepare an absorbent packet for use in shipping containers which will absorb water vapor, but not permit liquid water which may form inside the packet from permeating out from the absorbent packet.

It is a still further object of this invention to prepare a low cost absorbent packet which is comprised of a multi-layered, liquid impermeable packaging material with a microporous, gas permeable outer layer and a gas permeable inner layer.

It is a still further object of this invention to produce an absorbent packet which uses as the absorbing material a combination of an alkaline earth metal salt and a clay or starch product.

It is a still further object of this invention to produce an absorbent packet which not only absorbs water vapor, but maintains relative humidity within a shipping container for long periods of time.

These and other aspects of the invention will become apparent to those skilled in the art from a consideration of the following detailed description, drawings and claims. The description provides a selected example of construction of the device to illustrate the invention.

(c) SUMMARY OF INVENTION

In accordance with the present invention there is provided an absorbent packet for absorbing water vapor for use in a shipping container comprising (a) a gas permeable, liquid impermeable packaging material, and (b) an absorbent material contained within the multi-layered packaging material.

Preferably the absorbent material is a mixture of calcium chloride and clay or starch. Preferably the packaging material is a multi-layer material comprised of (1) a microporous, gas permeable film, (2) a gas permeable, support film, and (3) a binder to bind the microporous film to the gas permeable film.

(d) DETAILED DESCRIPTION OF THE PREFERRED EMBODIMENTS

Although the invention is adaptable to a wide variety of uses, it is embodied in an absorbent packet for absorbing water vapor in a shipping container comprising a gas permeable, liquid impermeable packaging material, which absorbs water vapor but does not permit liquid water which may form within the packet from leaking out of the packaging material. Preferably the packaging material is a multi-layered packaging material comprised of a microporous, gas permeable film, a gas permeable support film and a binder to bind the microporous film to the gas permeable film. Once the packaging film material is formed, an absorbent material, preferably comprised of calcium chloride and a clay or starch product, is introduced between layers of the material to form a packet and then the edges of the packet are sealed to produce the absorbent packet.

When a multi-layered packaging material is used as described above, the microporous film is preferably an open-celled microporous film. Microporous films are generally classified in two types: closed celled films, wherein the pores of the film are not interconnected, and open-celled film, wherein the pores are essentially interconnected through tortuous paths which may extend from one exterior surface or surface region to the opposite surface region. The open-celled microporous film of this invention may be formed by a number of different processes, including, for example, cold stretching, i.e. cold drawing the elastic film until porous surface regions or areas, which are elongated normally, and hot stretching, i.e. hot drawing, wherein the film is stretched after forming at a higher temperature to form the microporous product, and then heating or heat setting the porous film under tension or a combination thereof. In addition, other processes can be used, for example, forming the film and then subjecting it to processes which result in microporosity, such as by subjecting it to a laser beam (as taught in U.S. Pat. No. 4,856,649) or chemical action.

In a preferred embodiment, however, the microporous film is a microporous polypropylene sheet containing a calcium carbonate filler. In the preferred process for forming this film, a polypropylene powder is mixed with the calcium carbonate filler along with certain additives, such as plasticizers and antioxidants. The polypropylene powder preferably comprises about 30–50% of the mixture by weight with the calcium carbonate comprising preferably about 70–50%, and the additives, preferably about 1–5%. The polypropylene powder mixture is then extruded using conventional extruding procedures at a temperature of about 200° C.–300° C. to form pellets which are then subjected to a film extrusion procedure at a temperature of about 200° C.–300° C. to form a base sheet. This sheet is then stretched in both a longitudinal direction and a transverse direction to form the microporous polypropylene sheet. The calcium carbonate filler within the polypropylene sheet assists in the formation of these micropores by partially filling the pores during the formation process. A substantial portion of the calcium carbonate remains in the film after stretching, comprising as much as about 70% of the film by weight. The thickness of the film is from about 0.01 to 0.20 mm and preferably from 0.02 to 0.15 mm. The micropores are preferably about 1 micron in size. The preferred process for production of this film is disclosed in Nago, et al. "Structure of Microporous Polypropylene Sheets Containing $CaCO_3$ Filler", *Journal of Applied Polymer Science*, Vol. 45, pp. 1527–1535 (1992) and Nakamura, et al. "Microporous Polypropylene Sheets Containing $CaCO_3$ Filler", *Journal of Applied Polymer Science*, Vol. 49, pp. 143–150 (1993).

The gas permeable film which forms the second layer of the preferred multi-layered packaging material can be prepared from any conventional olefinic plastic film, paper sheet or nonwoven cloth which is gas permeable. It is critical that this film be both gas permeable and water impermeable and have sufficient strength to support the microporous film layer. Preferably, this gas permeable film is produced from non-woven polyester and/or polypropylene fibers formed into a non-woven cloth. This gas permeable film is preferably a dry-type, wet-type or spun-bond, non-woven cloth, with the more preferred material being manufactured by Takuso under the name GDT-2 or TYVEK® manufactured by DuPont. This film preferably weighs between about 10 and 400 $g/m^2$, preferably between 20 and 200 $g/m^2$, has a porosity in Gurley seconds from about 2 to about 50 seconds and a thickness from about 0.05 to about 0.2 mm.

In order to provide additional strength for the packaging material, these two films are bound together, preferably by an adhesive. Any conventional adhesive is acceptable which does not interfere with the gas permeability of the composite film. Thus, it is critical that the adhesive layer between these two layers not be applied too thickly or cover too much of the surface of either of the two films so as to prevent the passage of water vapor through both layers. Accordingly, preferably the adhesive material is placed between the layers in a disconnected or discontinuous pattern wherein the areas of adhesive material are separated by non-coated areas, for example, in a grid-like structure or a regular dot structure as disclosed, for example, in U.S. Pat. No. 4,725,465. For example, a mesh-like structure may be utilized, wherein the open space between the mesh is at least from about 0.05 microns to about 3 microns. Alternatively, individual dots of adhesive can be placed between the layers, wherein the dots are about 1 micron in diameter and separated from each other by about 1 to 5 microns. Preferably at least about 40 percent of each film remains uncovered by the adhesive. In a preferred embodiment the adhesive material is a polyurethane prepolymer solution manufactured under the name Unoflex J-3, by Sanyo Chemical Industries, Ltd.

The overall thickness of the preferred multi-layered packaging material is about 0.1 to about 1.0 mm., preferably about 0.1 to about 0.3 mm.

The absorbent material which is introduced into the absorbent packet can be any absorbing material with an enhanced capacity to absorb water vapor and which is also relatively low in cost. Preferably, the material should be able to absorb an amount of water up to at least about 50% of the dry weight of the absorbent material. The preferred absorbing material should exhibit high absorbing capacity for water vapor in ambient air conditions over long periods of time. The types of absorption materials that can be used include those commonly utilized in water absorbing products, such as an alkali-metal polyacrylate or an alkaline-metal partial salt of a cross linked poly (propenoic acid), such as a sodium or potassium polyacrylate or a partial sodium salt of poly (propenoic acid). Alternatively, and preferably, the absorption material is a combination of an inorganic alkaline earth salt, such as calcium chloride mixed with a clay or starch product. The calcium chloride is mixed with the clay or starch at a ratio from about 1 to 9 to about 3 to 7 and preferably from about 1 to 4 to about 1 to 1.

The clay mineral that may be used as an element of the absorbent product is preferably a smectite-type clay, especially an alkaline earth smectite such as calcium smectite, with a water uptake capacity (in terms of the dried smectite with a residual water content of about 6 weight percent) of at least about 50%, preferably about 60 to 130%, more preferably about 90 to 120%. Alternatively, the smectite may be a sodium alkaline smectite containing predominantly sodium ions as the replaceable cations and exhibiting a water uptake capacity of at least about 50% (with a residual water content of about 6 weight percent). Alternatively, a vermiculite or filler material such as wood fiber, paper pulp or other water absorbing materials can be used to replace a portion of the clay material.

If instead a starch product is used, preferably it is a potato starch with an absorption capacity of about 10–12 mls of water per gram of starch material. Preferable material is a potato starch produced by Avebe in Veendam, Holland.

In the process for the preparation of this absorbent packet, the multi-layered, gas permeable packaging material is first formed. In the formation of this gas permeable, liquid impermeable multi-layered packaging material, the microporous film, preferably a microporous polypropylene sheet material containing calcium carbonate, is prepared using the process as disclosed in Nago, et al. "Structure of Microporous Polypropylene Sheets Containing $CaCO_3$ Filler", *Journal of Applied Polymer Science*, Vol. 45, pp. 1527–1535 (1992). Once this microporous polypropylene sheet is prepared, the gas permeable film of the type previously discussed is then prepared. The microporous film is then bound to the gas permeable film by use of the adhesive material previously discussed. The adhesive should be applied so as to leave a significant portion of the surface of the composite film uncovered, thus allowing water vapor to pass through both layers. Preferably the gas permeable, microporous film is formed as the inner layer of the composite packaging material and the support film forms the outer layer of the composite material.

Once the multi-layered packaging material is formed, a continuous absorbent packet forming procedure is preferably used wherein the absorbent material is placed between two sheets of the gas permeable, multi-layered packaging material and the edges of the sheets are sealed, preferably by heat sealing. Alternatively, a single sheet of the composite, gas permeable, liquid impermeable sheet is produced and is folded over on itself after incorporation of the absorbent material into the packet. The remaining edges of the sheet are sealed, preferably heat sealed, to encapsulate the absorbent material. The amount of the absorbent material utilized in the absorbent packet varies with the need of the manufacturer. For example, in one preferred embodiment, a useful product can be produced that contains at least about 500 grams of the absorbent material in a bag which is about 5¾ inches by 10¼ inches to produce an absorbent packet which is quite effective in absorbing water vapor in a shipping container to preserve relative humidity without releasing liquid water back into the surrounding environment.

(e) EXAMPLES

Example 1

A multi-layered film comprised of a microporous film, a gas permeable, support film and a binder to bind the microporous film to the gas permeable film was formed. The microporous film was a microporous polypropylene sheet formed using a calcium carbonate filler according to the process described in Nago, et al. "Structure of Microporous Polypropylene Sheets Containing $CaCO_3$ Filler", Journal of Applied Polymer Science, Vol. 45, pp. 1527–1535 (1992).

The gas permeable film was GDT-2 produced by Takuso. This multilayered film was formed into a packet containing an absorbent material comprising a mixture of bentonite clay and calcium chloride at a ratio of 4 to 1. The packet whose dimensions were 5¾ inches by 10¼ inches and which contained about 500 grams of the bentonite clay/calcium chloride formulation was placed within an 8 cubic foot container at a relative humidity of 80% and held at a temperature of 25° C. for about 26 days. The maximum absorption capacity of the product was tested and showed an absorption capacity of 72.50%. In addition, after the test was complete, there was no evidence of any release of liquid moisture back into the surrounding environment from the absorbent packet. The packet did not transfer liquid or saline to other materials upon contact.

Example 2

An additional example was run on a product similar to the product of Example 1 under the same conditions as in Example 1. The absorption capacity of this product was 66.13%. No discharge of liquid water from the absorbent product was noted. The packet did not transfer liquid or saline to other materials upon contact.

Example 3

An example was run on a product similar to the product of Example 1, except the ratio of the bentonite clay to the calcium chloride in the absorbent material was 3 to 2. All other conditions were the same as in Example 1. The maximum absorption capacity of this sample was 108.15%. Again, no discharge of liquid water from the absorbent packet was noted. The packet did not transfer liquid or saline to other materials upon contact.

Example 4

An example was run on a product similar to the product of Example 1 except the ratio of the bentonite clay to calcium chloride in the absorbent material was adjusted to 1:1. All other conditions were the same as in Example 1. The absorption capacity of this sample was 136.62%. No discharge of liquid water from the absorbent product was noted. The packet did not transfer liquid or saline to other materials upon contact.

Example 5 (comparison)

A comparison test was performed on a sample of the product MBD-99®, manufactured by Australian Warehouse Solutions under the same conditions as in Example 1. The absorption capacity of this product was 47.97%. After the test was run, the product was damp to the touch and would transfer water or saline back to the environment.

Example 6 (comparison)

A comparison test was performed on a sample of the product Super-O-Sec®, manufactured in France by Sodepac under the same conditions as in Example 1. The absorption capacity of this product was 53.48%. After the test was run, the product was damp to the touch and would transfer water or saline back to the environment.

Example 7 (comparison)

A comparison test was performed on a sample of the product Dri-Bag®, manufactured by Anders Bendt of Denmark under the same conditions as in Example 1. The absorption capacity of this product was 47.49%. After the test was run, the product was damp to the touch and would transfer water or saline back to the environment.

Example 8 (comparison)

A comparison test was performed on a sample of silica gel obtained from W. R. Grace/Davison, under the conditions as in Example 1 except the test was run for 14 days. The absorption capacity of the silica gel was 39.52%. After the test was run, the product was damp to the touch and would transfer water or saline back to the environment.

In addition to the higher absorption capacity of the products produced according to the instant invention, the products were physically examined to determine if any liquid water would escape from the product. There was no discernible evidence of any liquid water even after 26 days on Examples 1, 2, 3 and 4. In contrast, liquid water discharge was noted in Examples 5, 6, 7 and 8.

I claim:

1. An absorbent packet for absorbing water vapor in a container comprising
   (a) a gas permeable, water impermeable packaging material comprising an inner microporous, gas permeable, liquid water impermeable film, an outer gas permeable support film and a binder that binds the microporous film to the gas permeable support film, wherein said packaging material prevents liquid water which forms within the packet from leaking out of the packet; and
   (b) an absorbent material contained within the gas permeable, water impermeable packaging material.

2. The absorbent packet of claim 1 wherein the microporous film is a non-woven polyethylene or polypropylene film.

3. The absorbent packet of claim 1 wherein the microporous film is an open celled microporous film.

4. The absorbent packet of claim 1 wherein the absorbent material is a combination of calcium chloride and clay.

5. The absorbent packet of claim 4 wherein the percentage of the calcium chloride is from about 20 to about 80%.

6. The absorbent packet of claim 1 wherein the absorbent material is a combination of calcium chloride and starch.

7. The absorbent packet of claim 4 wherein the clay is a smectite clay with a water uptake capacity of at least about 50%.

8. The absorbent packet of claim 1 wherein the binder is secured to the microporous film and the gas permeable film in a regular pattern.

9. The absorbent packet of claim 1 where the gas permeable, water impermeable packaging material includes a microporous film comprised of a non-woven polyethylene or polypropylene film.

10. The absorbent packet of claim 9 wherein the absorbent material contained within the gas permeable liquid impermeable packaging material is a combination of calcium chloride and clay.

11. The absorbent packet of claim 10 wherein the ratio of the calcium chloride to clay is at least about 1:4.

12. An absorbent packet for absorbing water vapor in a container comprising
    (a) a gas permeable, water impermeable packaging material comprising a microporous, gas permeable film, a gas permeable support film and a binder that binds the microporous film to the gas permeable support film, wherein the microporous film is a microporous polypropylene film containing calcium carbonate, and wherein said packaging material prevents water formed within the packet from leaking out of the packet; and
    (b) an absorbent material contained within the gas permeable, water impermeable packaging material.

13. The absorbent packet of claim 12 wherein the microporous film contains at least about 30% calcium carbonate.

14. The absorbent packet of claim 12 wherein the microporous film is formed from approximately 30 to 50% polypropylene powder, approximately 70 to 50% calcium carbonate and approximately 1 to 5% additives.

15. The absorbent packet of claim 12 wherein the absorbent material is a combination of calcium chloride and clay.

16. The absorbent packet of claim 15 wherein the percentage of the calcium chloride is from about 20 to about 80%.

17. The absorbent packet of claim 15 wherein the clay is a smectite clay with a water uptake capacity of at least about 50%.

18. The absorbent packet of claim 15 wherein the ratio of the calcium chloride to clay is at least about 1:4.

19. The absorbent packet of claim 12 wherein the absorbent material is a combination of calcium chloride and starch.

20. The absorbent packet of claim 12 wherein the binder is secured to the microporous film and the gas permeable film in a regular pattern.

21. An absorbent packet for absorbing water vapor in a container comprising
    (a) a gas permeable, water impermeable packaging material wherein the gas permeable, water impermeable packaging material includes a microporous film comprised of a non-woven polyethylene or polypropylene film and wherein the microporous film is formed from approximately 30 to about 50% polypropylene, approximately 70 to 50% calcium carbonate, and approximately 1 to 5% of an additive; and
    (b) an absorbent material contained within the gas permeable, liquid impermeable packaging material.

22. An absorbent packet for absorbing water vapor in a container comprising:
    (a) a gas permeable, water impermeable packaging material comprising a microporous, gas permeable film, a gas permeable support film and a binder that binds the microporous film to the gas permeable support film, wherein the microporous film is a microporous polypropylene film containing calcium carbonate; and
    (b) an absorbent material contained within the gas permeable, water impermeable packaging material.

23. The absorbent packet of claim 22 wherein the microporous film contains at least about 30% calcium carbonate.

24. An absorbent packet for absorbing water vapor in a container comprising:

(a) a gas permeable, water impermeable packaging material comprising a microporous, gas permeable film, a gas permeable support film and a binder that binds the microporous film to the gas permeable support film, wherein the microporous film is formed from approximately 30 to 50% polypropylene, approximately 70 to 50% calcium carbonate and approximately 1 to 5% of an additive; and (b) an absorbent material contained within the gas permeable, water impermeable packaging material.

* * * * *